United States Patent
Milburn, Jr.

[15] 3,672,087
[45] June 27, 1972

[54] FISHING BOBBER MECHANISM

[72] Inventor: Raymond E. Milburn, Jr., Route 1, P.O. Box 128, Round Lake, Ill. 60073

[22] Filed: Dec. 17, 1970

[21] Appl. No.: 99,160

[52] U.S. Cl. ..........................................43/44.88, 43/44.91
[51] Int. Cl. .......................................................A01k 93/00
[58] Field of Search ......................................43/44.88, 44.91

[56] References Cited

UNITED STATES PATENTS

| | | | |
|---|---|---|---|
| 992,341 | 5/1911 | Davis | 43/44.88 |
| 2,326,510 | 8/1943 | Worden | 43/44.88 |
| 2,531,806 | 11/1950 | Coughlin | 43/44.91 |
| 2,678,511 | 5/1954 | Wright | 43/44.88 X |
| 3,168,790 | 2/1965 | Creasey | 43/44.88 X |
| 3,353,294 | 11/1967 | Mundorff et al. | 43/44.91 |
| 3,577,669 | 5/1971 | Johnson | 43/44.88 X |

*Primary Examiner*—Samuel Koren
*Assistant Examiner*—Daniel J. Leach
*Attorney*—Barnes, Kisselle, Raisch & Choate

[57] ABSTRACT

A fishing bobber having a hollow float and a yieldably biased plunger slidably received in a chamber to engage a portion of a fishing line extending through the float. A latch tripped by a rapid upward movement of the line releases the plunger to engage the line and restrain its movement through the float.

7 Claims, 6 Drawing Figures

PATENTED JUN 27 1972
3,672,087
SHEET 1 OF 2
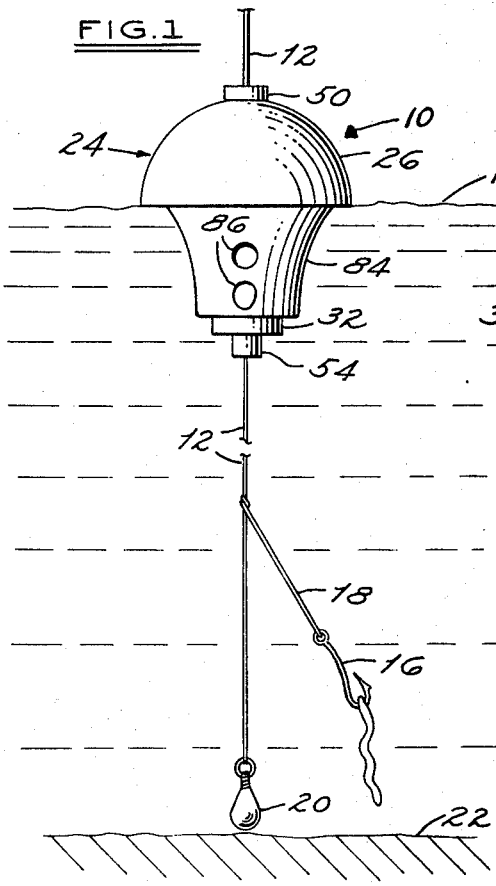
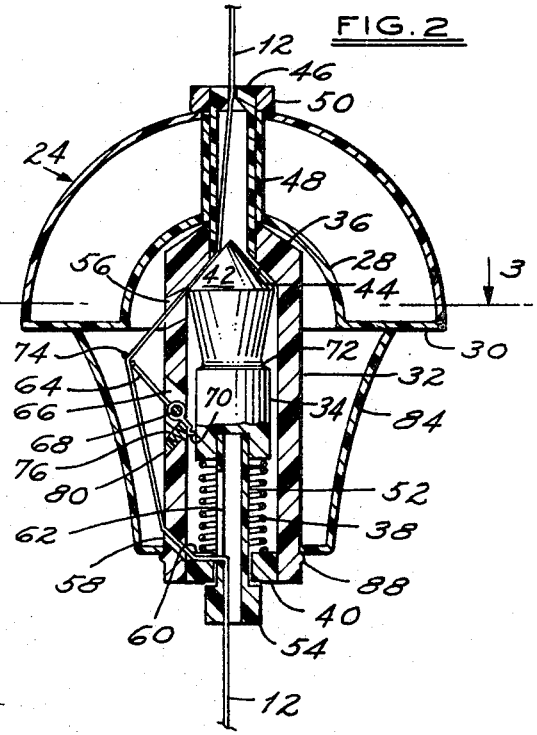
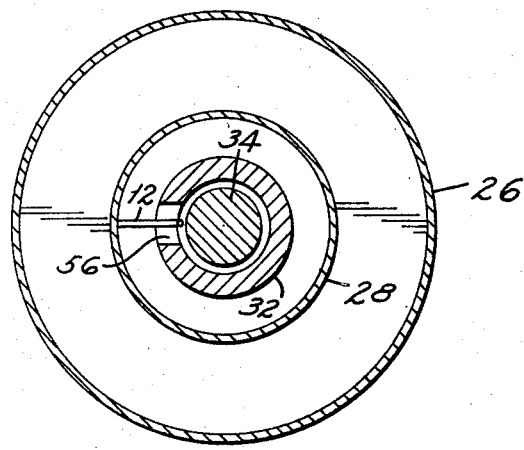
INVENTOR
RAYMOND E. MILBURN, JR.
BY
Barnes, Kisselle, Laisch & Choate
ATTORNEYS

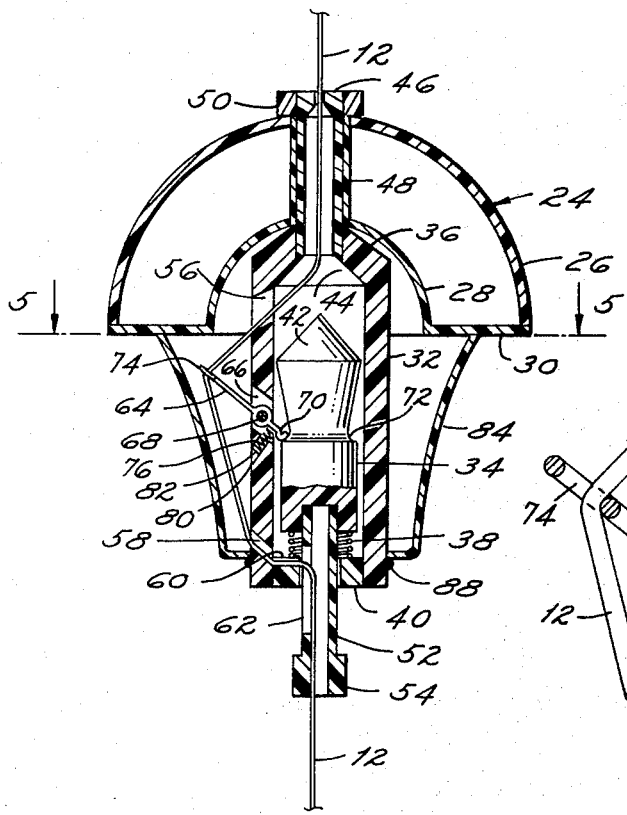
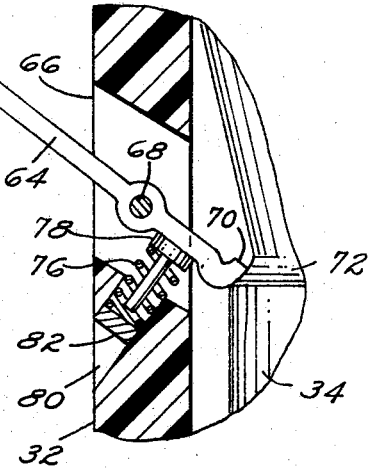
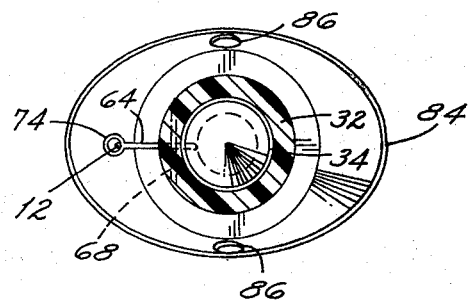

3,672,087

FISHING BOBBER MECHANISM

This invention relates to bobbers for fishing lines and more particularly to a fishing bobber that can be releasably locked to a fishing line.

Objects of this invention are (1) to provide a fishing bobber which can be releasably clamped to a fishing line after the line and bobber are in a body of water and the line has sunk to the desired depth in the body of water, and (2) to provide such a device of economical construction and assembly.

These and other objects, features and advantages of this invention are disclosed in the following specification and accompanying drawings in which:

FIG. 1 is a side view of a fishing bobber constructed in accordance with this invention illustrating the bobber attached to a fishing line and floating in the water of a lake.

FIG. 2 is a side view in section of the fishing bobber of FIG. 1 with the bobber locked or clamped to the fishing line.

FIG. 3 is a sectional view on line 3—3 of FIG. 2.

FIG. 4 is a side view in section similar to FIG. 2 with the fishing bobber unclamped or released from the fishing line.

FIG. 5 is a sectional view on line 5—5 of FIG. 4.

FIG. 6 is an enlarged fragmentary sectional view of the latch mechanism of the fishing bobber.

Referring to the drawings:

FIG. 1 illustrates a fishing bobber 10 constructed in accordance with this invention connected to a fishing line 12 of a fishing pole (not shown) and floating in the water of a lake 14. A fishhook 16 is connected by a leader 18 to fishing line 12 and a sinker 20 is fixed to the lower end of line 12 and rests on the bottom 22 of lake 14.

As shown in FIGS. 2 and 4, bobber 10 has a float 24 which buoys the bobber on the surface of lake 14. Float 24 has a plastic hemispherical outer shell 26 and a plastic hemispherical inner shell 28 with an equatorial flange 30 sealed and connected to outer shell 26 by an epoxy cement. Float 24 carries a generally axially-extending hollow tubular cylinder 32 with a plunger 34 slidably received therein. Plunger 34 is yieldably urged toward an abutment wall 36 of cylinder 32 by a spring 38 which bears on a plug 40 fixed in the lower end of cylinder 32. Plunger 34 has a conical surface 42 adjacent its free end which mates with a frusto-conical surface 44 on abutment wall 36 of cylinder 32. A hollow tubular guide 46 for line 12 extends through and is fixed to abutment wall 36 of cylinder 32. Guide tube 46 is received in a sleeve 48 fixed to inner and outer shells 26 and 28 by an epoxy cement. Guide tube 46 is releasably retained in float 24 by a locking ring 50 pressed over its free end. A hollow tubular guide 52 for line 12 with a head 54 extends axially through plug 40 and is fixed to plunger 34. To facilitate passage of line 12 through bobber 10, cylinder 32 is provided with openings 56 and 58 in its side wall, plug 40 has a radially-extending groove 60 in its upper face, and guide tube 52 has an axially-extended slot 62.

As shown in FIGS. 4 and 6, plunger or clamping member 34 is releasably retained in a position spaced from abutment wall 36 by a lever arm 64. Lever arm 64 extends through an opening 66 in the side wall of cylinder 32 and is pivotally mounted thereon by a pin 68. Lever arm 64 has a generally U-shaped latch portion 70 which engages with a circular groove 72 in the central portion of plunger 34 to restrain the plunger from moving toward abutment wall 36. A ring 74 on the other end of lever 64 encircles and frictionally engages line 12. Lever 64 is urged in a counterclockwise direction about pivot pin 68 by a spring 76 and rider 78. Spring 76 is received in a bore 80 in the side wall of cylinder 32 and bears on a plug 82 in bore 80. A plastic cover 84 in the shape of a ferrule with a side wall having an oval cross-section and water drainage holes 86 (as shown in FIG. 5) encircles cylinder 32 and is releasably retained on cylinder 32 by integral detents 88 on the lower end of cylinder 32. Cover 84 shields lever arm 64 and the portion of line 12 extending along the outer wall of cylinder 32.

In using bobber 10, plunger 34 is manually shifted to the retracted position shown in FIG. 4 by gripping and pulling on the exposed head 54 of guide and reset tube 52. Plunger or clamping member 34 is retained in the retracted position by latch portion 70 of lever arm 64 being urged by spring 76 into locking engagement with groove 72 in the plunger. Cover 84 is removed from cylinder 32 over detents 88 to facilitate threading fishing line 12 through bobber 10. Fishing line 12 is threaded through guide 46, the upper end of cylinder 32 between abutment wall 36 and plunger 34, hole 56 in cylinder 32, ring 74 of lever arm 64, the lower end of cylinder 32 through hole 58, groove 60 in plug 40, slot 62 in guide 52, and out through guide 52, as shown in FIGS. 2 and 4. After threading line 12 through bobber 10, cover 84 is replaced over cylinder 32 and retained by detents 88 to shield lever arm 64. A sinker 20 is connected to the lower or free end of line 12 and a fishhook 16 attached to the line by a leader 18. Bobber 10 and fishing line 12 are placed in the water of lake 14 and the line is played-out from the fishing pole (not shown) to allow sinker 20 to carry line 12 and fishhook 16 toward the bottom 22 of the lake. When fishhook 16 sinks to the desired depth in lake 14, the fisherman gives fishing line 12 a rapid generally axially upward movement or jerk to lock bobber 10 to the fishing line. The jerk of line 12 moves the portion of the fishing line adjacent ring 74 of lever arm 64 upward and generally radially inward toward the side wall of cylinder 32. This movement of the fishing line causes lever 64 to pivot clockwise (as shown in FIGS. 2, 4 and 6) about pin 68 and thereby disengage latch portion 70 from groove 72 of plunger 34. This releases plunger 34 so that it is moved by spring 38 toward abutment wall 36 of cylinder 32. The movement of plunger 34 toward wall 36 urges line 12 into firm frictional engagement with conical surface 42 of plunger 34 and frusto-conical surface 44 of wall 36. This frictional engagement restrains line 12 from moving with respect to bobber 10, thereby holding fishhook 16 at the desired depth in lake 14. By properly selecting the force applied by spring 38 to line 12 the frictional engagement will both retain the line at the desired depth of fishhook 16 and still allow the line to slip through the bobber after it engages the tip of the fishing rod as the line is reeled in through the rod.

Fishing line 12 is released or unclamped from bobber 10 by manually gripping head 54 of tube 52 and pulling the tube axially downward or away from bobber 10. This movement of tube 52 disengages plunger 34 from line 12 and moves it axially downward in cylinder 32 against the bias of spring 38. As plunger 34 moves fully downward in cylinder 32, lever 64 is moved counterclockwise by spring 76 and latch portion 70 of the lever engages in circular groove 72 to retain the plunger in the retracted position. This resets bobber 10 so that it is again ready to be placed in lake 14.

What is claimed as new is as follows:

1. A fishing bobber adapted to releasably engage a fishing line comprising; a float, an abutment carried by said float, a movable clamping member adapted for movement toward and away from said abutment, means for guiding a fishing line between said abutment and said clamping member, means adapted to urge said clamping member toward said abutment and into firm engagement with a fishing line therebetween to restrain the fishing line from moving with respect to said clamping member, latch means releasably retaining said clamping member in a position spaced from said abutment to allow the fishing line to move with respect to said abutment and said clamping member, and means operatively associated with said latch means and responsive to motion of the fishing line to release said latch means from retaining said clamping means in said spaced position in response to a rapid generally upward movement of the fishing line to allow said clamping member to bear on the fishing line to restrain movement of the fishing line with respect to said abutment and said clamping means.

2. The fishing bobber of clamp 1 which also comprises a hollow cylinder carried by said float and in which said clamping member comprises a plunger slidably received in said cylinder.

3. The fishing bobber of claim 2 in which said means for guiding a fishing line between said abutment and said clamping member comprises a tube extending generally axially from one end of said cylinder.

4. The fishing bobber of claim 2 in which said means operatively associated with said latch means comprises a lever arm pivotally connected to said cylinder with one end extending therefrom and adapted to slidably receive the fishing line and said latch means comprises the opposite end of said lever arm adapted to engage a recess in said plunger.

5. The fishing bobber of claim 4 which also comprises means extending generally axially through one end of said cylinder and being fixed to said plunger and slidably movable through said cylinder to manually reset said plunger against the bias of said urging means.

6. The fishing bobber of claim 5 which also comprises a cover shielding said lever arm.

7. The fishing bobber of claim 6 in which said means adapted to urge said clamping member toward said abutment comprises a spring.

* * * * *